Patented Jan. 5, 1937

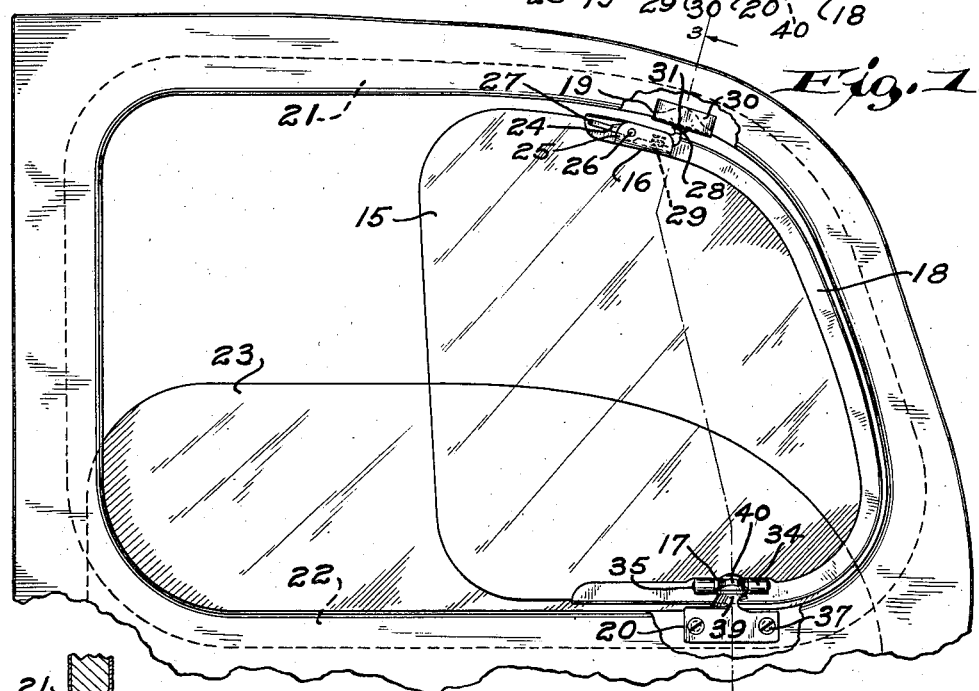

2,066,432

UNITED STATES PATENT OFFICE 2,066,432

AIR DEFLECTOR

Joel R. Thorp, West Allis, Wis., assignor to The Fulton Company, West Allis, Wis., a corporation of Wisconsin Application August 1, 1934, Serial No. 737,897

7 Claims. (Cl. 296—84)

The present invention relates generally to improvements in the art of ventilating movable enclosures, and relates more specifically to improvements in the construction and operation of air deflectors associable with the main windows of vehicles for the purpose of effecting controllable ventilation of the interior of the vehicles with minimum discomfort to the occupants.

An object of the invention is to provide an improved air deflector for vehicles, which is simple and durable in construction, and which may be readily displaced from normal position for the purpose of permitting access to all portions of the main window with which the deflector is associated.

It has heretofore been proposed, as shown and described in Benzick application Serial No. 693,592, filed October 14, 1933, to provide a ventilating shield associable with the side window reveal of an automobile in such manner that the shield may normally be angularly adjusted about a substantially vertical axis located closely adjacent the outer surface of the main, vertically slidable window, combined with mechanism carried by the upper shield supporting bracket for releasing the upper end of the shield and for permitting swinging thereof away from the main window about a substantially horizontal hinge associated with the lower shield supporting bracket. Such swinging of the ventilating or air deflecting shield away from the main window is desirable for the purpose of permitting ready access to all portions of the outer surface of the main window glass, especially for cleaning of the latter, and the prior structure just referred to has proven highly successful and beneficial in actual commercial use. However, due to the fact that the upper release for the deflector shield of this prior device is associated directly with the upper, fixed, supporting bracket of the ventilator, this bracket is relatively complicated in structure and difficult to manufacture and to apply to the irregular reveals of most vehicles, and this structural complexity also makes the releasing mechanism somewhat difficult to actuate.

The present invention therefore contemplates provision of releasing mechanism for an end of a normally pivotally adjustable air deflector, which eliminates the defects and complications of the prior Benzick device above referred to, but which possesses all of the desirable features thereof.

Another specific object of the present invention is to provide improved mechanism for disconecting a ventilating shield from its normal supporting bracket quickly and with minimum effort.

A further specific object of the invention is to provide an improved, releasable, normally swingable window wing for vehicular windows, which may be readily manufactured, installed, and manipulated so as to effect free access to all portions of the main window structure.

Still another specific object of the invention is to provide an improved lever release which is carried directly by the shield of an air deflector and which is cooperable with a simple bracket attachable to odd-shaped window reveals of various types of automobiles, so as to permit most effective, normal pivotal supporting of the shield and rapid removal thereof from normal position.

An additional specific object of the present invention is to provide a durable ventilating accessory which may be attached to any standard car to produce a highly finished and attractive appearance without undesirably marring the vehicle.

Another specific object of the invention is to provide an improved, locked pivot bearing which may be easily released by the application of thumb pressure so as to permit the upper end of a deflector shield with which the bearing is associated to be swung outwardly away from the normal support thereof.

A further specific object of the invention is to provide a releasable universal bearing for a window wing, which automatically locks the wing in normal position when the same is swung from released into normal position.

These and other specific objects and advantages will be apparent from the following detailed description.

A clear conception of several embodiments of the invention, and of the mode of constructing, applying, and of utilizing air deflectors built in accordance with the improvement, may be had by referring to the drawing accompanying and forming a part of this specification, in which like reference characters designate the same or similar parts in the various views.

Fig. 1 is an inside elevation of the upper portion of the front door of an automobile, showing one of the improved air deflectors attached thereto adjacent the upper and lower parts of the main window reveal, and also showing the main window glass partially lowered;

Fig. 2 is a horizontal section thru the outer portion of the main window frame of the door structure of Fig. 1, showing a full top view of the air deflector in normal, active position;

Fig. 3 is a section thru the air deflector and window assemblage of Fig. 1, taken along the line 3—3 and showing the main window partially lowered, while the deflector shield is shown in full line active position and in dot-and-dash position removed from the plane of sliding of the main window;

Fig. 4 is an enlarged, fragmentary, top view and section taken along the line 4—4 of Fig. 3, showing the lower mounting for the air deflector;

Fig. 5 is a similarly enlarged section thru the releasable upper mounting for the shield of Figs. 1 to 4 inclusive, showing the pivot bearing in released position;

Fig. 6 is a sectional view of a modified type of releasable upper mounting for an air deflector, showing the parts in normal or active position; and Fig. 7 is a similar view of the modified structure of Fig. 6, showing the parts in released position.

Altho the invention has been shown and described herein as being applied to a specific type of pivotally adjustable air deflector especially adapted for cooperation with the front side window of an automobile having a reveal of peculiar shape, it is not intended to limit the scope by such specific disclosure. It is also to be understood that some of the novel features of ventilating wing construction shown and described but not claimed broadly herein, form no part of the present invention since they form the subject of my prior application Serial No. 690,822, filed September 25, 1933, and of the said Benzick application Serial No. 693,592, filed October 14, 1933.

Referring specifically to Figs. 1 to 5 inclusive of the drawing, the improved ventilator or air deflector shown therein comprises generally a transparent deflector shield 15 preferably formed of plate or shatter-proof glass; upper and lower pivot elements 16, 17 respectively, associated with a protective channel strip 18 permanently attached to and covering the front edge and forward portions of the upper and lower edges of the shield 15; and upper and lower bracket elements 19, 20 respectively, coacting with the pivot elements 16, 17 and adapted for permanent attachment to the upper and lower forward portions 21, 22 of the reveal of the main side window 23 of an automobile.

A packing of resilient material such as sheet rubber may be interposed between the protecting and stiffening channel strip 18 and the adjacent edges of the transparent shield 15; and the upper pivot element 16 comprises a lever 24 pivotally supported directly upon the upper end of the shield 15 within a flange 25 which is formed integral with the adjacent portion of the strip 18, by means of a pivot pin 26. The portion of the lever 24 at one side of the pivot pin 26 is provided with a manipulating handle 27, while the opposite end portion of this lever is formed as a bearing ball 28; and a coiled compression spring 29 coacts with the flange 25 and with the ball end of the lever 24 so as to constantly urge the bearing ball 28 in an upward direction, as clearly shown in Figs. 1 and 5.

The upper bracket element 19 is formed of sheet metal and comprises a flange 30 engageable with the inner side of the upper reveal portion 21, and a socket 31 adapted to receive the lever ball 28 so as to permit universal pivotal motion between the coacting parts. The outer lip of the bracket element 19 is formed to snugly fit the contour of the adjacent reveal portion 21; and a flexible filler plug 32, formed of rubber or the like, is interposed between the reveal portion 21 and the socket 31 and is cooperable with the top of the ball 28 to provide friction tending to hold the shield 15 in angularly adjusted position. The bracket element 19 may be rigidly and permanently attached to the adjacent upper reveal portion 21 by means of screws or otherwise; and while the lever ball 28 normally engages the socket 31 to provide a pivotal mounting for the deflector shield 15, this ball may be withdrawn from the pivot socket as shown in Fig. 5, by merely applying thumb pressure to the handle 27 of the lever 24.

The lower pivot element 17 comprises a bifurcated, sheet metal member 33 horizontally swingably attached to spaced ears 34 formed integral with the lower portion of the channel strip 18 by a lower hinge pivot pin 35, and the bifurcations of the member 33 are spaced vertically and are formed with adjacent, spherical zone surfaces. The lower portion of the strip 18 adjacent the ears 34 is provided with a stop flange 36 which is adapted to engage the lower portion of the member 33 to definitely limit the outward swinging of the shield about the pivot pin 35 when the ball 28 is released from the pivot socket 31 of the upper bracket, as will be apparent from Fig. 4.

The lower bracket element 20 is likewise preferably formed of sheet metal, being adapted for permanent and rigid attachment to the inner side of the lower reveal portion 22 by means of screws 37 or the like as shown in Figs. 1 and 3. The bracket element 20 has an integral projection 38 shown in Fig. 4 for definitely positioning the same relative to the screw or bolt holes in the reveal portion 22, and also has an integral, outwardly extending, spherically curved projection 39 adapted to be positioned between the spherical zone surfaces of the bifurcations of the member 33. A pivot bolt 40 having an adjustable clamping nut 41 and a lock washer, associated therewith, penetrates alined holes in the bifurcations of the member 33 and a somewhat larger hole in the fixed projection 39, as clearly shown in Figs. 3 and 4. This pivot bolt 40 permits pivotal movement of the shield 15 about a substantially vertical axis which is not necessarily alined with the pivotal axis of the ball 28 and socket 31, and the nut 41 may be adjusted to provide sufficient friction between the projection 39 and the bifurcations of the pivot member 33 so that the shield 15 will be maintained in various positions of pivotal adjustment.

In the modified type of releasing mechanism for the upper pivot and bracket elements, specifically shown in Figs. 6 and 7, the lever 24' which carries the pivot ball 28' intermediate its ends, has a handle 27' at one end thereof and a pivot pin 26' coacting with its opposite end, the pivot 26' again being mounted in a flange 25' formed integral with the reenforcing channel strip 18 of the shield 15. The bracket element 19' which cooperates with the pivot element 16' is provided with a modified socket 31' and with a flexible filling plug 32. The ball 28' is normally retained within the socket 31' by means of a compression spring 29' coacting with the lever 24' and with the flange 25' as shown in Fig. 6; and by pulling the lever handle 27' downwardly to the position shown in Fig. 7 so as to release the ball 28 from the socket 31', the shield 15 may again be swung outwardly about its lower hinge pivot 35 and away from the plane of sliding of the main window 23. The remaining structure of the modification, including the lower pivot and bracket elements, is the same as shown in Figs. 1 to 4 inclusive, and the mode of installing and of manipulating the modified assemblage is the same as in the main embodiment, except for the release of the upper pivotal connection.

The improved air deflector is shown fully assembled and installed in Figs. 1, 2, and 3, and when thus applied, the shield 15 is swingably adjustable to any desired angular position relative to the plane of sliding of the main window 23, so as to either prevent air from entering the vehicle enclosure while the same is in motion, or to scoop air into this enclosure. When the shield is set at but a limited angle relative to the main window 23, the latter may be freely, vertically adjusted without obstruction by the wing, and the shield 15 may be adjusted to the position shown in full lines in Figs. 1 and 3, when not being used for air circulating purposes. The friction at the upper and lower pivot elements 16, 17 will normally hold the shield 15 in any desired position of adjustment, while permitting convenient change in the angular setting of the shield, which may, if desired, be almost completely rotated when the main window 23 is lowered or opened entirely.

If it becomes desirable to obtain access to the outer surface of the main window 23 adjacent to the ventilating device, the deflector shield may be readily released by applying thumb pressure to the handle 27 of the lever 24, sufficiently to release the ball 28 from the socket 31, whereupon the shield 15 may be swung into the dot-and-dash line position indicated in Fig. 3, the stop flange 26 retaining the shield in such position upon release of the lever handle 27. The main window 23 may then be elevated and the outer surface thereof cleaned. Such outward swinging of the ventilating shield 15 may be effected even if the pivot elements 16, 17 are not swung into a position wherein the shield 15 is parallel to the plane of sliding of the window 23, and is permitted by virtue of the horizontal disposition of the hinge pivot 35. When it is desired to reestablish the pivotal connection between the upper pivot element 16 and the bracket element 19, it is merely necessary to swing the shield 15 inwardly to cause the ball 28 to snap into the socket 31, the spring 29 permitting such automatic reestablishment of the connection. With the shield 15 returned to normal position, it may again be angularly adjusted as desired for ventilating purposes.

As previously indicated, the modified form of the invention shown in Figs. 6 and 7 will function in identically the same manner, but the release in the modification is obtained by pulling down upon the lever 24' instead of pressing upwardly thereagainst as in the embodiment of the invention shown in Fig. 5. In both forms of the invention, the releasing mechanism for the upper pivot is carried directly by the shield, and is of relatively simple form and readily operable.

From the foregoing description, it will be apparent that the present invention provides a simple, compact, and readily adjustable deflector shield structure which may be conveniently removed so as to permit unobstructed access to the outer surface of the main window 23 with which the air deflector cooperates. The assemblage may be readily applied to various types of vehicles having reveals of various shapes, and the lower, horizontal hinge pivot 35 serves no function other than to permit removal of the shield 15 for the purpose of gaining access to the external surface of the main window 23. Undesirable stress in the transparent shield 15 is eliminated in the present device, solely by the universal pivotal connections between the pivotal elements 16, 17 and the supporting bracket elements 19, 20; and by virtue of the use of such universal pivotal connections, the improved air deflector is made readily applicable to reveals or portions of reveals, which are not parallel to each other. The improved air deflector has proven highly successful in actual commercial use and can be manufactured and sold at moderate cost.

It should be understood that it is not desired to limit the present invention to the exact details of construction and operation herein shown and described, for various modifications within the scope of the claims may occur to persons skilled in the art.

It is claimed and desired to secure by Letters Patent:

1. In combination with a main window, a deflector shield, lower and upper brackets for supporting said shield from adjacent portions of the main window reveal, a pivot element carried by the lower medial part of said shield and permanently universally pivotally connected to said lower bracket, said pivot element providing a horizontal hinge for said shield, an upper pivot element carried by the upper medial part of said shield and normally having universal pivotal cooperation with said upper bracket, and a movable lever carried by said shield and coacting with said upper pivot element to detach the latter from said upper bracket.

2. In combination with a main window, a deflector shield, lower and upper brackets for supporting said shield from adjacent portions of the main window reveal, a pivot element carried by the lower medial part of said shield and permanently universally pivotally connected to said lower bracket, said pivot element providing a horizontal hinge for said shield, an upper pivot element carried by the upper medial part of said shield and normally having universal pivotal cooperation with said upper bracket, a movable lever carried by said shield and coacting with said upper pivot element to detach the latter from said upper bracket, and resilient means coacting with said lever to normally hold said upper pivot in pivotal engagement with said upper bracket.

3. In combination with a main window, a deflector shield located adjacent the plane of sliding of the main window, a pivot element between the lower portion of the main window reveal and the adjacent portion of said shield, said pivot element affording both a vertical pivotal mounting for the lower end of said shield and a hinge for permitting swinging of said shield away from the vertical pivotal axis, a lever pivotally supported upon the upper end of said shield, and a spherical pivot carried by said lever and cooperating with the adjacent upper portion of the main window reveal to provide a pivotal mounting for the upper shield portion, said spherical pivot being releasable by means of said lever to permit swinging of said shield upon the hinge afforded by the lower pivot element.

4. In combintion with a main window, a deflector shield, a combined hinge and pivot element interposed between the lower medial portion of said shield and the adjacent portion of the main window reveal, a lever supported ball carried by the upper medial portion of said shield, and a socket associated with the adjacent upper portion of the main window reveal and cooperating with said ball to provide an upper pivotal mounting for said shield, the lever being operable to release said ball from said socket.

5. In combination with a main window, a deflector shield, a combined hinge and pivot element interposed between the lower end of said shield and the adjacent portion of the main window reveal, a socket associated with an upper portion of the main window reveal, a lever pivotally attached to the upper portion of said shield, and a ball carried by said lever and cooperating with said socket to provide an upper pivotal mounting for said shield, said ball being removable from said socket to permit swinging of said shield upon said lower hinge element.

6. In combination with a main window, a deflector shield, a combined hinge and pivot element interposed between the lower end of said shield and the adjacent portion of the main window reveal, a socket associated with an upper portion of the main window reveal, a lever pivotally attached to the upper portion of said shield, a ball carried by said lever and cooperating with said socket to provide an upper pivotal mounting for said shield, said ball being removable from said socket to permit swinging of said shield upon said lower hinge element, and resilient means also coacting with said lever for constantly urging said ball toward said socket.

7. In combination with a main window, a deflector shield, a hinge element interposed between the lower end of said shield and the adjacent portion of the main window reveal, a socket fixedly associated with an upper portion of the main window reveal, a pivot ball resiliently supported by the upper portion of said shield and cooperating with said socket to provide a detachable pivotal connection, and means carried by said shield for removing said ball from said socket to permit swinging of said shield upon said hinge element.

JOEL R. THORP.